United States Patent [19]

Pruden

[11] Patent Number: 4,667,970
[45] Date of Patent: May 26, 1987

[54] LONG-STROKE HIGH-FORCE CHUCK

[75] Inventor: Samuel H. Pruden, East Hartford, Conn.

[73] Assignee: Cushman Industries, Incorporated, Hartford, Conn.

[21] Appl. No.: 773,022

[22] Filed: Sep. 6, 1985

[51] Int. Cl.[4] .................. B23B 31/16; B23B 31/26
[52] U.S. Cl. .................. 279/120; 279/110; 279/119; 279/121; 279/1 C
[58] Field of Search .................. 279/118–120, 279/66, 110, 1 C, 121

[56] References Cited

U.S. PATENT DOCUMENTS

| 2,722,427 | 11/1955 | Labeyrie | 279/110 X |
| 2,852,265 | 9/1958 | Van Dinen | 279/66 |
| 4,009,888 | 3/1977 | Wallace | 279/119 X |

FOREIGN PATENT DOCUMENTS

| 2611923 | 9/1977 | Fed. Rep. of Germany | 279/119 |
| 272774 | 8/1970 | U.S.S.R. | 279/119 |
| 418283 | 8/1974 | U.S.S.R. | 279/119 |

*Primary Examiner*—Eugene F. Desmond
*Assistant Examiner*—Steven C. Bishop
*Attorney, Agent, or Firm*—Walter Spruegel

[57] ABSTRACT

Chuck provides for each jaw an action bar extending substantially longitudinally of the chuck axis and rockable in an action plane radiating from the chuck axis and intersecting the jaw, and a pair of first and second slides for each action bar, with said slides being guided for movement in the associated action plane in opposite directions normal to the chuck axis, with the first slide pivotally supporting the bar intermediate its ends about an axis normal to the action plane, the second slide having with one end of the bar a floating pivot connection with its pivot axis extending normal to the action plane, and the other end of the bar having with the jaw a floating pivot connection with its pivot axis extending normal to the action plane, so that on moving the first slide relative to the other slide in opposite directions the bar is rocked about its floating pivot connection with the second slide as a fulcrum for opening and closing the jaw, and on moving the second slide relative to the first slide in opposite directions the bar is rocked about its pivot support on the first slide as a fulcrum to increase the pressure of the closed jaw on work to gripping magnitude and decrease the jaw pressure on the work below gripping magnitude. The chuck further provides actuators for programmed cyclic movements of all pairs of slides to close all jaws on work and then apply the jaw grip to the work, then relinquish the jaw grip and retract the jaws from the work.

11 Claims, 8 Drawing Figures

LONG-STROKE HIGH-FORCE CHUCK

This invention relates to chucks in general, and to long-stroke high-force chucks in particular.

The invention is concerned with a chuck of a type of which the jaws have long strokes and adequate jaw forces for a secure work grip.

It is the primary aim and object of the present invention to provide a chuck of this type which for jaw actuation provides for each jaw an action bar that extends substantially longitudinally of the chuck axis and is rockable in an action plane which extends radially from the chuck axis and intersects the associated jaw, with the bar being with its front end operatively connected with the jaw for imparting to it its operational strokes into and from closure on work on rocking the bar in a first operational mode about its rear end as a fulcrum, and for imparting to the closed jaw its gripping force on work on rocking the bar in a second operational mode at its rear end about a fulcrum intermediate its ends. With this arrangement, the strokes of the jaws are at a maximum owing to the rocking of the bars in the first mode, while due to the rocking of the bars in the second mode the gripping forces of the jaws may vastly exceed the jaw pressure thereon on closing the jaws on the work. To the end of thus rocking the action bars, each bar is pivotally supported intermediate its ends on a first slide which is guided for movement in the associated action plane in opposite directions normal to the chuck axis, with the axis of the pivot support extending normal to the action plane, the rear end of the bar has a floating pivot connection with a second slide which is also guided for movement in the same action plane in opposite directions normal to the chuck axis, and the operating connection of the front end of the bar with the jaw is also a floating pivot connection, so that on moving the first slide relative to the second slide the bar is rocked in the aforementioned first operational mode about its floating pivot connection with the second slide as a fulcrum, and on moving the second slide relative to the first slide the bar is rocked in the aforementioned second operational mode about the pivot support of the bar on the first slide as a fulcrum. Further, each first slide is moved toward and away from the chuck axis for closing the jaws and for opening the jaws, respectively, while each second slide is moved away from and toward the chuck axis for applying the jaw grip on work and relinquishing it, respectively.

It is another important object of the present invention to provide in a chuck of this type first and second slide actuators which are operatively connected with the respective first and second slides, and are operable in cycles of prescribed first and second halves each. Thus, in operation of the slide actuators during the first half of each cycle the first actuators will move the first slides toward the chuck axis for closing the jaws on work and the second actuators will then move the second slides away from the chuck axis for applying a firm jaw grip on the work, and in operation of these actuators during the second half of each cycle the second actuators will move the second slides toward the chuck axis to relinquish the jaw grip on the work and the first actuators will then move the first slides away from the chuck axis to open the jaws.

By virtue of the simple back-and-forth movements of the slides in their guided paths normal to the chuck axis, they readily and advantageously lend themselves to operation by actuators of accustomed wedge or lever type. Thus, the actuators may be provided on first and second plungers in the form of wedge formations with which the respective first and second slides are in follower relation, with these plungers being arranged in tandem and movable axially of the chuck, in one direction for each described first half cycle operation of the wedge formations on the first and second plungers, and the plungers being movable in the opposite direction for each described second half cycle operation of these wedge formations. With the purpose of long jaw strokes and high jaw forces in mind, the wedge formations on the plungers have different angles, with the angles of the wedge formations on the first and second plungers being preferably relatively large and relatively small, respectively, for long jaw strokes and high jaw forces, respectively. For preferred operational movement of the plungers axially of the chuck, they are spring-coupled into normal end-to-end abutment with each other, so that on driving the second plunger from a home position in the described one direction, the first plunger will, due to the spring coupling, be dragged along and cause closure of the jaws on work when the first plunger comes to a stop but the second plunger continues to move relative to the stopped first plunger for causing the closed jaws to exert a firm gripping force on the work. Conversely, on driving the second plunger in the opposite direction back into home position, the second plunger will first return into abutment with the first plunger to cause release of the jaw grip on the work, whereupon on joint movement of the abutting plungers still in the same direction the jaws will be retracted from the work into open position. With this arrangement, the wedge formations on the plungers will, on the joint movement of the latter in the described one direction, impart to the action bars through the interposed slides compound motions in jaw-closing direction until the jaws are closed on the work. The arrangement of the spring-coupled plungers has several advantages, chief among which is the requirement of but one driver for the programmed drive of both plungers, with the driver being in the preferred form of a drawbar, for example. The slide actuators may also be in the form of levers with advantages similar to those of the described wedge-type slide actuators.

It is stil another object of the present invention to provide a chuck of this type in which the aforementioned second slides are arranged, weight-wise, to function also as counterweights for substantial counterbalance of the jaws in operation of the chuck.

Further objects and advantages will appear to those skilled in the art from the following, considered in conjunction with the accompanying drawings.

In the accompanying drawings, in which certain modes of carrying out the present invention are shown for illustrative purposes:

Figure 1:
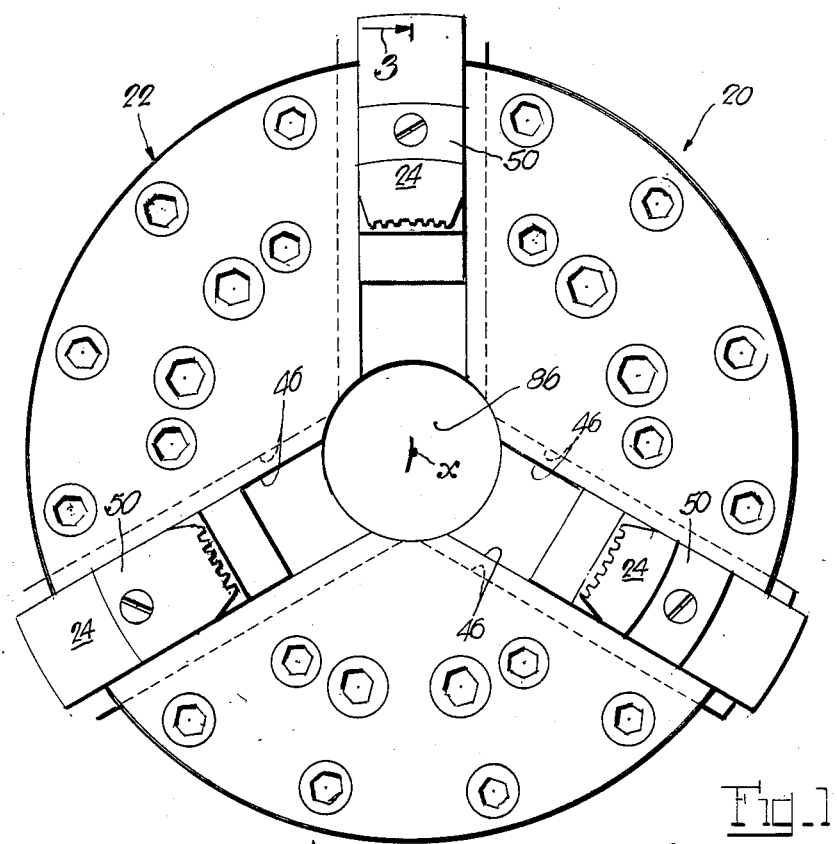
FIG. 1 is a front view of a chuck embodying the invention.
Figure 2:
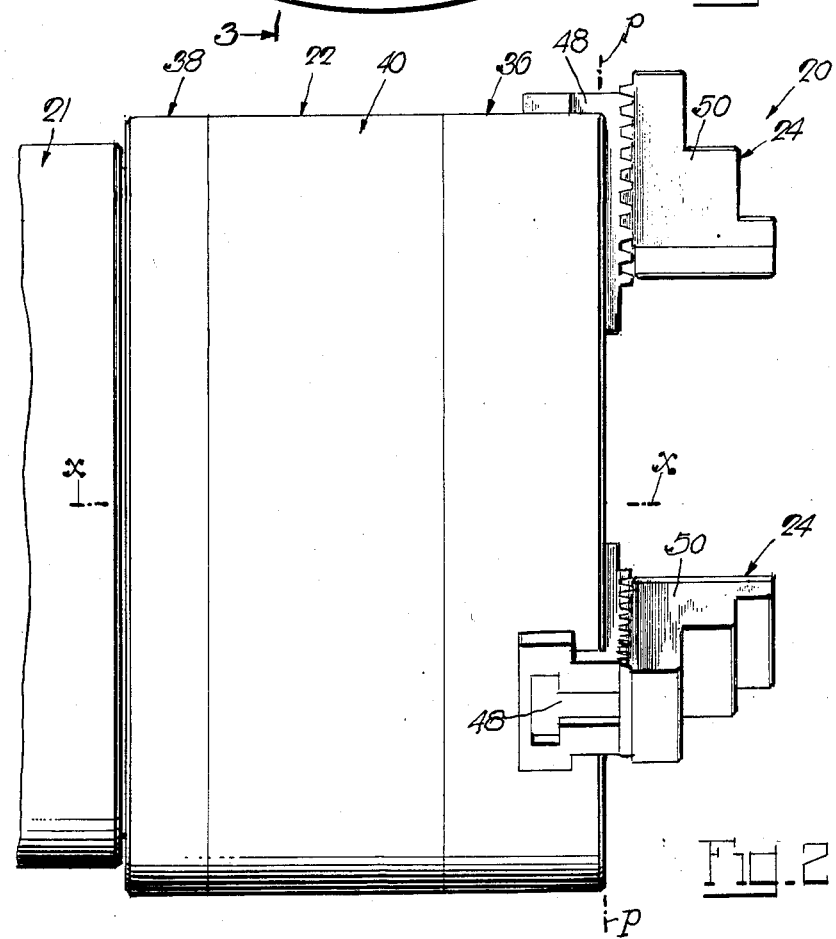
FIG. 2 is a side elevation of the chuck.
Figure 3:
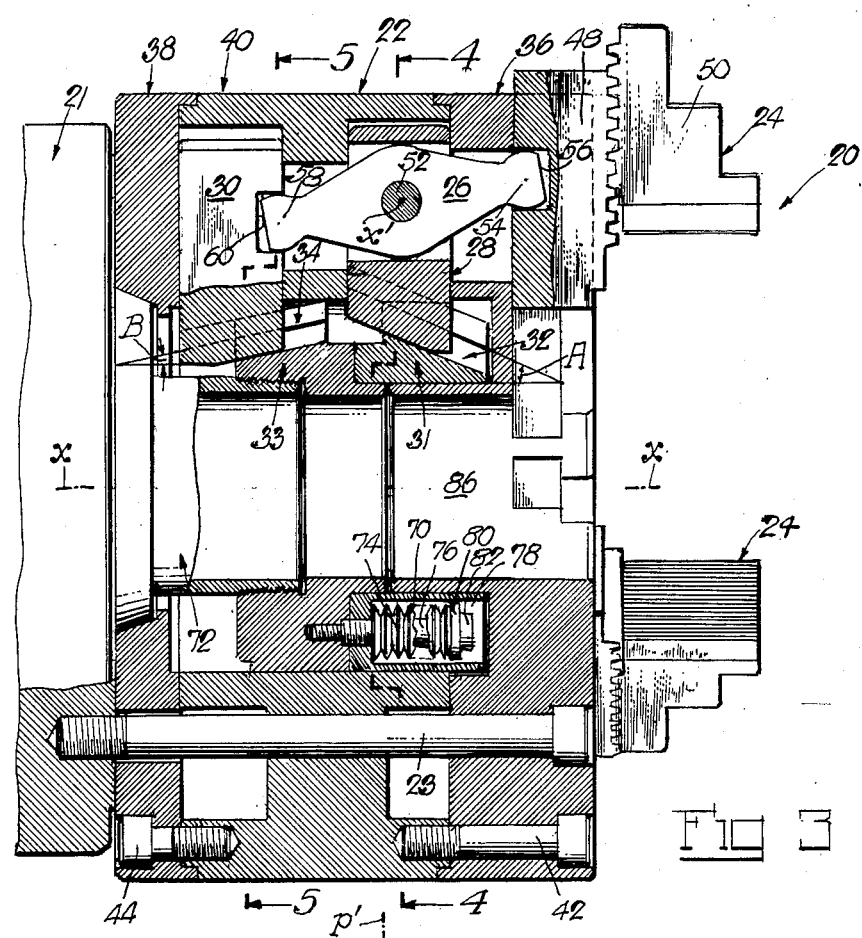
FIG. 3 is a longitudinal section through the chuck taken substantially on the line 3—3 of FIG. 1.
Figure 4:
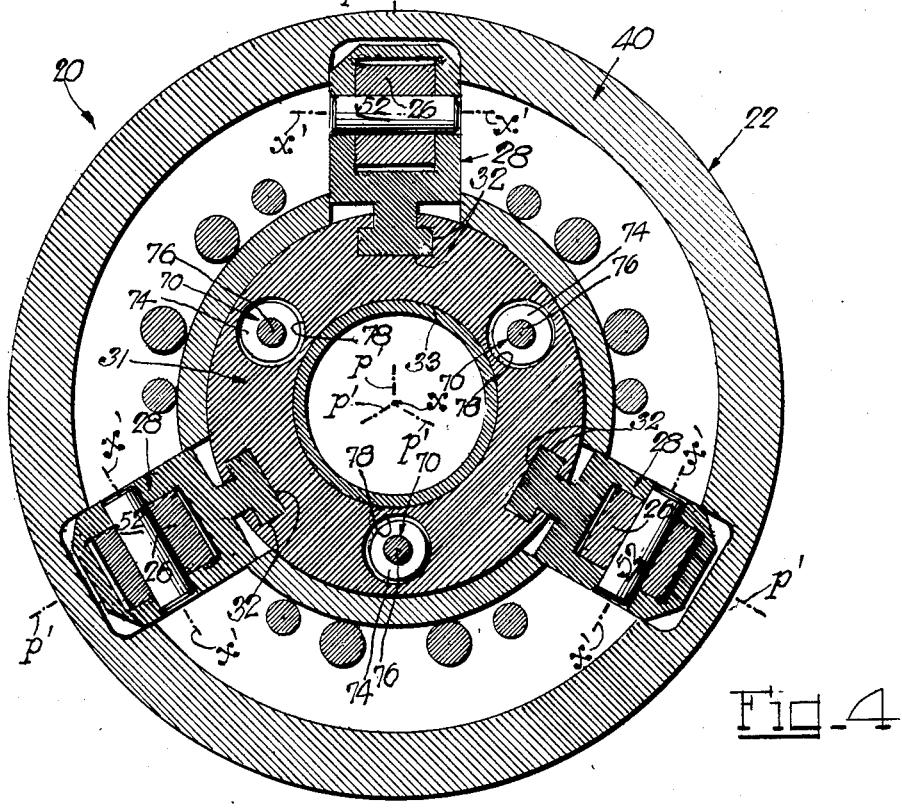
Figure 5:
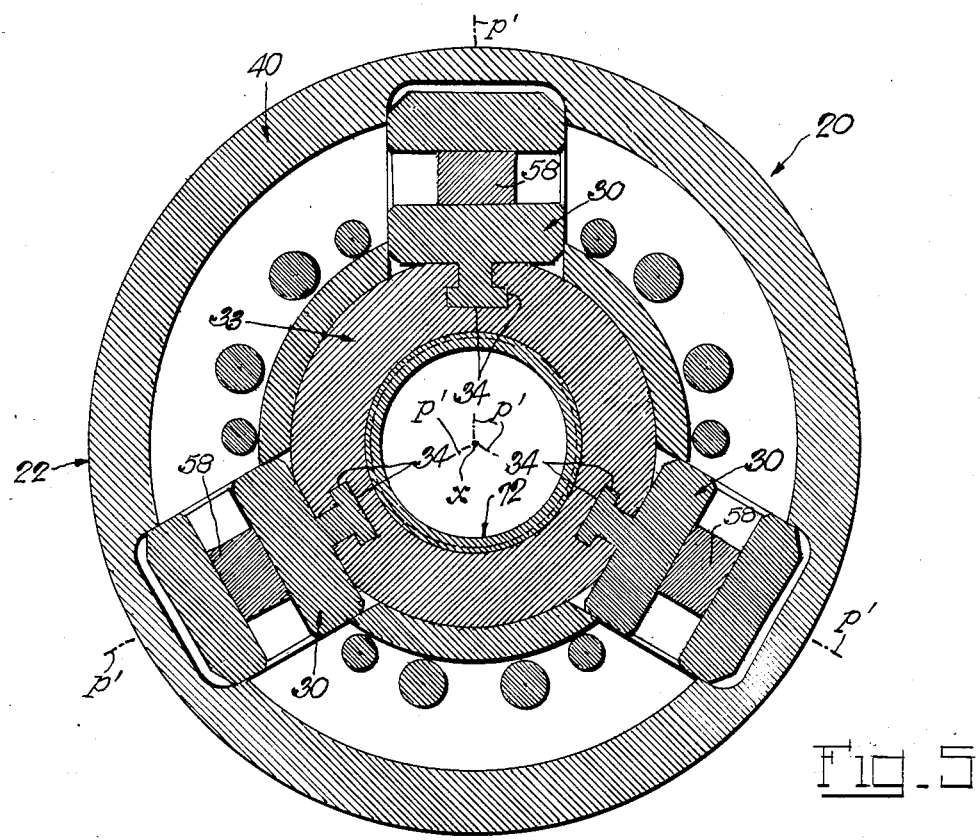
Figure 6:
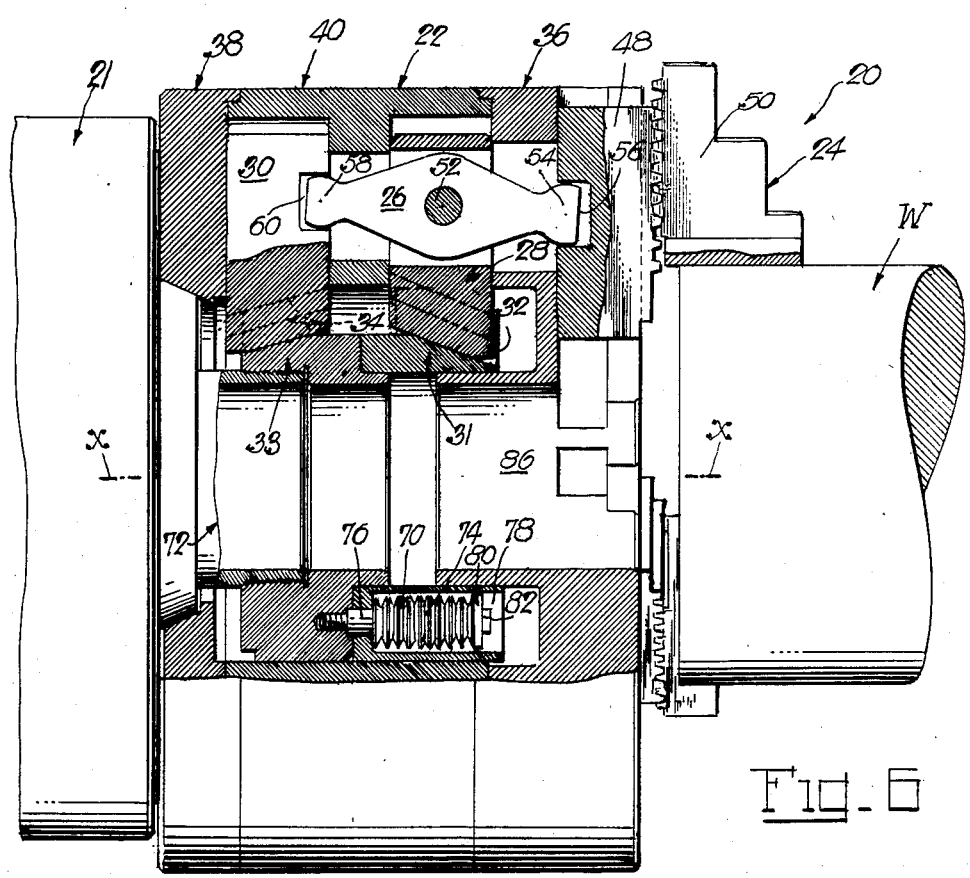
Figure 7:
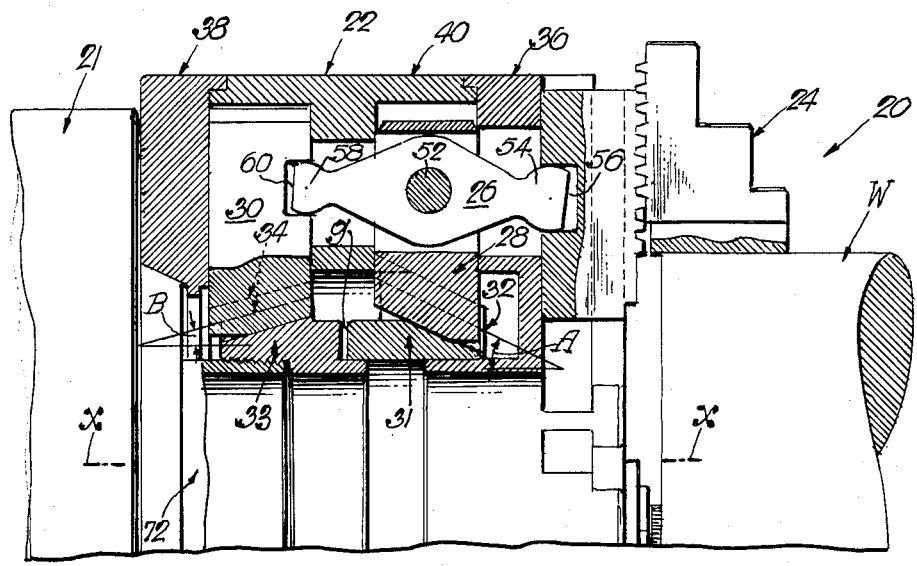
Figure 8:
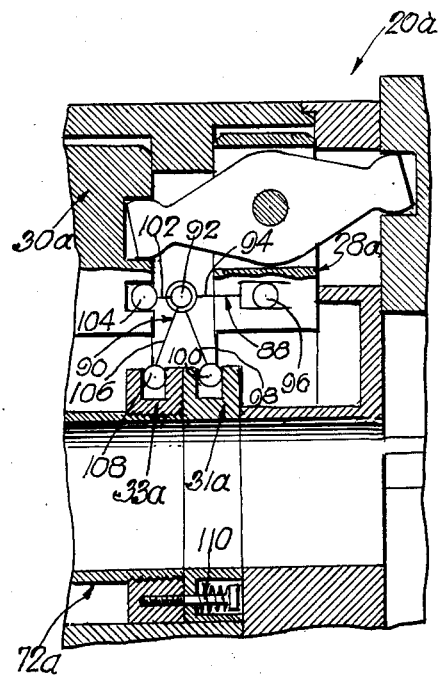

FIGS. 4 and 5 are cross-sections through the chuck taken substantially on the lines 4—4 and 5—5, respectively, of FIG. 3;

FIGS. 6 and 7 are longitudinal sections through the chuck similar to that of FIG. 3, but showing the chuck in different stages of its operation; and FIG. 8 is a fragmentary longitudinal section through a chuck embodying the invention in a modified manner.

Referring to the drawings, and more particularly to FIGS. 1 to 6 thereof, the reference numeral 20 designates a chuck having as its major components a chuck body 22 with a longitudinal axis x, a plurality of jaws 24, an action bar 26 for each jaw, a pair of slides 28 and 30 for each action bar 26, and a pair of slide actuators 32 and 34 for the respective slides 28 and 30 of each pair.

The chuck body is in this instance composed of opposite front and rear sections 36 and 38 and an intermediate section 40 which are joined together by screws 42 and 44. Provided in the front of the chuck body are guideways 46 in which the jaws 24 are guided for movement in a common plane p normal to, and in opposite directions radially of, the chuck axis x, with each jaw 24 being composed of a master 48 and a top jaw 50 thereon. The chuck is in this instance mounted on the power spindle 21 of a lathe or the like by screws 23.

Each action bar 26 extends substantially longitudinally of the chuck axis x, and is mounted intermediate its ends on a pivot pin 52 with an axis x' such that the action bar 26 is rockable on this pivot pin in an action plane p' which radiates from the chuck axis x and intersects the associated jaw (FIGS. 3 and 4). To this end, the pivot pin 52 for each action bar 26 is carried by one of the slides 28 which is guided in the intermediate body section 40 for movement in the associated action plane p' in opposite directions normal to the chuck axis x (FIG. 4), with the pivot axis x' of the pin 52 extending normal to this action plane. The front end 54 of each action bar has a floating pivot connection 56 with the associated jaw 24, while the rear end 58 of the bar has a floating pivot connection 60 with the associated slide 30 which is guided in the intermediate body section 40 for movement in the associated action plane p' in opposite directions normal to the chuck axis (FIGS. 3 and 5), with the pivot axes of the floating pivot connections 56 and 60 extending normal to the associated action plane p'.

For operation of the slides 28 and 30 of each pair associated with an action bar 26, the chuck provides a pair of slide actuators 32 and 34 which in this instance are in the form of wedges with which the respective slides 28 and 30 are in follower relation. For simultaneous operation of the respective wedges 32 and 34, they are formed on plungers 31 and 33, respectively, which are supported in the intermediate body section 40 for movement axially of the chuck (FIGS. 3, 4 and 5). Thus, on moving the plunger 31 with the wedge formations 32 to the left in FIG. 3 and relative to the other plunger 33 with the wedge formations 34, the slides 28 will simultaneously be moved inwardly toward the chuck axis x, whereby the associated action bars 26 will by their pivot supports 52 on these slides 28 be rocked about the floating pivot connections 60 between the rear ends of these action bars and their associated slides 30 as fulcrums, with the result that the action bars 26 impart to the associated jaws 24 their inward strokes into closure on exemplary work W (FIG. 6). Conversely, on moving the plunger 33 with the wedge formations 34 axially of the chuck to the left in FIG. 6 and relative to the other plunger 31, the slides 30 will be moved outwardly away from the chuck axis x, whereby the associated action bars will by their floating pivot connections 60 with the slides 30 be rocked clockwise in FIG. 6 about their pivot supports 52 on the other slides 28 as fulcrums for imparting to the closed jaws their work-gripping forces.

The plungers 31 and 33 are operated in cycles of first and second halves each, with their wedge formations 32 and 34 functioning during the first half of each plunger cycle to cause inward motion of the jaws 24 from their open position (FIG. 3) into closure on work W (FIG. 6), whereupon the pressure of the closed jaws on the work will be increased to a safe work-gripping magnitude (FIG. 7), and these wedge formations function during the second half of each plunger cycle to reduce the pressure of the jaws on the work below work-gripping magnitude (FIG. 6), and then return the jaws to their open position (FIG. 3). To the end of cyclically operating the plungers 31 and 33, the chuck may provide separate drivers such as, for instance, two independently movable telescoped drawbars connected with the respective plungers 31 and 33 (not shown).

For preferred cyclic operation of the plungers 31 and 33, they are at 70 spring-coupled into normal end-to-end abutment with each other (FIGS. 3 and 4), and only one driver, in this instance a drawbar 72, is connected with the plunger 33 for cyclic operation of both plungers. Each spring coupling 70 provides in this instance a spring 74 and a bolt 76 (FIGS. 3 and 4), of which the bolt 76 is threadedly received in the plunger 33 and extends into a bore 78 in the other plunger 31, and the spring 74 is in this instance in the form of dished discs which surround the bolt 76 and are interposed between the bottom of the bore 78 and a washer 80 at the head 82 of the bolt, with the bolt 76 being threaded into the plunger 33 to a depth at which the washer 80 holds the spring 74 preloaded for coupling the plungers together with a predetermined force. The plungers 31 and 33 are in this instance ring-shaped to leave the chuck with a through-hole 86, and the drawbar is to the same end of tubular form. The drawbar may in this instance extend rearwardly through the power spindle 21 and be connected to a piston in a cylinder behind the spindle for its operation.

In operation of the chuck, and assuming that the jaws 24 are open (FIG. 3) and are to be loaded with work W, the drawbar 72 is for the first half cycle operation of the plungers 31 and 33 moved to the left as in FIG. 3, whereby the drawbar drives the plunger 33 in the same direction and the plunger 31 is dragged along by virtue of the spring couplings 70 between the plungers. In the course of such joint movement of the plungers 31 and 33 to the left from their home position in FIG. 3, the wedge formations 32 and 34 on the plungers 31 and 33 will, through intermediation of the slides 28 and 30 and action bars 26, impart to the jaws compound motion in jaw closing direction. The plungers 31 and 33 will thus be moved jointly to the left until the jaws close on the work W (FIG. 6) when the plunger 31 comes to a stop in consequence but the other plunger 33 continues its drive relative to the stopped plunger 31 and opens a gap g between the plungers (FIG. 7), thereby actuating the slides 30 to rock the action bars 26 in jaw-closing direction for increasing the pressure of the closed jaws on the work to work-gripping magnitude (FIG. 7). After the work W has thus been gripped by the jaws, the same is machined as intended. After the work has been machined, the drawbar 72 is shifted to the right (FIG. 7) for the drive of the plungers 31 and 33 back to the home position for their second half cycle performance. Thus, immediately on the drive of the plunger 33 to the right relative to the stopped plunger 31 (FIG. 7), the wedge formations 34 on the plunger 33 will actuate the slides 30 inwardly toward the chuck axis and thereby rock the action bars 26 in jaw-opening direction sufficiently to decrease the jaw pressure on the work below work-gripping magnitude. At this time the plunger 33 has returned into abutment with the plunger 31 (FIG. 6) so that both plungers then continue jointly back into their home position, as will be readily understood.

The arrangement whereby the action bars 26 are rocked about the floating pivot connections between their ends 58 and the slides 30 as fulcrums is, of course, highly effective for long jaw strokes. Further, contributing to the length of the jaw strokes are the angles A of the wedge formations 32 on the plunger 31 which to this end may be relatively large, and may in fact be so large that the pressure of the closed jaws on work would be far inadequate for a safe hold of the work. Conversely, the angles B of the wedge formations 34 on the plunger 33 may be, and preferably are, relatively small, and are in any event so small as to keep the work-gripping forces of the jaws at an entirely safe magnitude. Also, while due to the advantageous spring couplings 70 between the plungers 31 and 33 and their drive by the single drawbar 72, the wedge formations 32 and 34 on these plungers wil, through the interposed slides 28,30 and action bars 26, impart compound motions to the jaws in closing and opening directions during parts of successive half-cycle operations of the plungers, such compound motions of the jaws in closing and opening does in no wise interfere with the length of the jaw strokes, as will be readily understood.

The slides 30 may also function advantageously as counterweights for the jaws by designing the slides, weightwise, so that they will substantially countrbalance the jaws in operation of the chuck.

Reference is now had to FIG. 8 which shows a chuck 20a that embodies the invention in a modified manner by providing the slide actuators in the form of levers 88 and 90. These levers 88 and 90 for each jaw are shown diagrammatically in FIG. 8. Thus, lever 88 is of bellcrank type and pivoted on a fixed pin 92, with one arm 94 of this lever having a floating pivot connection 96 with the associated slide 28a, and the other arm 98 of this lever being at 100 operatively connected with the plunger 31a. The other lever 90 is also of bellcrank type and pivoted in this instance on the same pin 92 for rocking movement independently of the lever 88, with one arm 102 of this lever 90 having a floating pivot connection 104 with the associated slide 30a, while the other arm 106 of this lever 90 is at 108 operatively connected with the plunger 33a. The plungers 31a and 33a are movable axially of the chuck, and are at 110 spring-coupled to each other into normal end-to-end abutment, while a single drawbar 72a is connected by the plunger 33a. In order that this chuck 20a may function similarly as the described chuck 20 in FIGS. 1 to 7, the arms 94 of each lever 88 is preferably longer than the arm 102 of the associated lever 90, and the arm 102 of each lever 90 is preferably shorter than its other arm 106. The operation of this modified chuck is self-evident and requires no further description.

While the present chuck has been described for gripping work externally, the chuck is also operable to grip hollow work on its inner diameter. To that end, the described actions of the operating components of the chuck are simply reversed. Thus, to grip hollow work internally, the drawbar 72 is moved to the right (FIG. 6) in order to cause the jaws 24 to move outwardly and grip hollow work internally, while movement of the drawbar 72 in the opposite direction will retract the jaws from the work and release the latter, as will be readily understood. Of course, in the operational movement of the drawbar 72 for gripping work, the plungers 31, 33 are in solid abutment and the separate action of the wedge formations 34 for increasing the pressure of the jaws after closure on the work to special work-gripping magnitude is here lost, but this will in most cases be of no consequence since the work-gripping force from the joint simultaneous action of the wedge formations 32, 34 is in most cases entirely adequate since centrifugal force on the jaws is no factor in this chuck application.

What is claimed is:

1. A method of operating a jaw in a chuck with an axis by an action bar to one end of which the jaw is operatively connected, which comprises rocking the bar about its other end as a fulcrum in opposite directions in an action plane radiating from the chuck axis and intersecting the jaw for opening and closing the jaw, respectively, and rocking the bar at its other end in opposite directions in said action plane about a median bar axis normal to said action plane for imparting to the jaw a work-gripping force and relinquishing it, respectively.

2. In a chuck with an axis, the combination of jaws guided for movement in a first plane normal to, and in opposite directions normal to, said axis, action bars associated with said jaws and movable in action planes radiating from said axis and intersecting the respective jaws, with each of said bars having intermediate its ends an axis normal to the associated action plane, and one end of each bar having with the associated jaw a floating pivot connection about an axis normal to the associated action plane, means for rocking said bars about their other ends as fulcrums in opposite directions for opening and closing said jaws, respectively, and means for rocking said bars at said other ends about their axes as fulcrums in opposite directions for increasing the pressure of the closed jaws on work to work-gripping magnitude and reducing it below work-gripping magnitude, respectively.

3. In a chuck with a longitudinal axis, the combination of jaws guided for movement in a common plane normal to, and in opposite directions radially of, said axis, action bars associated with said jaws and extending substantially longitudinally of said axis, and pairs of first and second slides associated with said jaws, of which the slides of each pair are guided for movement in an action plane radiating from said axis and in opposite directions normal to said axis, with said first slide of each pair providing for the associated bar a pivot support intermediate its ends about an axis normal to the associated action plane, said second slide of each pair having with one end of the associated bar a floating pivot connection about an axis normal to the associated action plane, and the other end of said second slide having with the associated jaw a floating pivot connection about an axis normal to the associated action plane, so that on movement of said first slides relative to said second slides in opposite first and second directions said bars will be rocked about their floating pivot connections with said second slides as fulcrums for closing said jaws on work and for opening them, respectively, and on movement of said second slides relative to said first slides in opposite third and fourth directions said bars will be rocked about their pivot supports on said first slides as fulcrums for increasing the pressure of the closed jaws on work to work-gripping magnitude and for decreasing the jaw pressure on work below work-gripping magnitude, respectively.

4. The combination in a chuck as in claim 3, which further provides pairs of slide actuators, of which first and second actuators of each pair are operatively connected with the respective first and second slides of each pair, and operable in a first mode to move said first slide in said first direction for jaw closure and then move said second slide in said third direction, and operable in a second mode to move said second slide in said fourth direction and then move said first slide in said second direction.

5. The combination in a chuck as in claim 4, in which said slide actuators of each pair are first and second wedges with which the respective first and second slides of each pair are in follower relation, with said first and second wedges being movable axially of the chuck in opposite fifth and sixth directions away from and toward said common plane, respectively for their operation in said first and second modes, respectively, and said first wedges having larger wedge angles than said second wedges.

6. The combination in a chuck as in claim 5, which further provides first and second plungers having first and second wedge formations constituting said first and second wedges, respectively, said plungers being arranged in tandem and spring-coupled into normal end-to-end abutment with each other and being movable axially of the chuck in said fifth and sixth directions, with said first plunger being interposed between said second plunger and common plane, and a driver connected with said second plunger and operable in third and fourth modes to drive said second plunger in said fifth direction and then in said sixth direction, respectively, whereby on the drive of said second plunger in said fifth direction said first plunger will follow said second plunger until stopped when said jaws close on work, whereupon on the continued drive of said second plunger relative to the stopped first plunger the closed jaws exert their gripping forces on the work, and on the drive of said second plunger in said sixth direction the same will return into abutment with the stopped first plunger and then move jointly with the latter for relinquishing the jaw grip on the work and then opening the jaws.

7. The combination in a chuck as in claim 6, in which said driver is a drawbar movable axially of the chuck in said fifth and sixth directions for its operation in said third and fourth modes, respectively.

8. The combination in a chuck as in claim 7, in which said plungers are ring-shaped to leave the chuck with a through-hole, and said drawbar is tubular.

9. The conbination in a chuck as in claim 4, in which said slide actuators of each pair are first and second bellcrank levers with first and second transverse arms and pivoted intermediate their arms about axes normal to the associated action plane, with said first arms of said first and second levers having with the respective first and second slides floating pivot connections about axes normal to the associated action planes, and first and second plungers movable axially of the chuck in opposite seventh and eighth directions away from and toward said common plane and operatively associated with said second arms of said first and second levers, respectively, for operating said levers in said first and second modes on moving said plungers in said seventh and eighth directions, respectively.

10. The combination in a chuck as in claim 9, in which said first arms of said first levers are longer than said first arms of said second levers, and said second arms of said second levers being longer than said first arms thereof.

11. The combination in a chuck as in claim 3, in which said second slides are designed, weightwise, to function as counterweights for substantial counterbalance of the jaws in operation of the chuck.

* * * * *